Patented Jan. 17, 1950

2,494,587

UNITED STATES PATENT OFFICE 2,494,587

FORMING GASEOUS SULFIDES AND SULFIDATION THEREWITH

Hubert A. Shabaker, Media, Pa., assignor to Houdry Process Corporation, Wilmington, Del., a corporation of Delaware No Drawing. Application December 4, 1947, Serial No. 789,611

17 Claims. (Cl. 252—450)

The present invention relates to the preparation and use of sulfiding gases and particularly to chemical modification of iron-containing clays and earths by reaction with sulfiding gases.

In a copending application, Serial No. 644,423, filed jointly in the names of myself, George Alexander Mills, and Ruth C. Denison, now U. S. Patent No. 2,466,048, issued April 5, 1949, there are disclosed methods for improving clays and preparing catalysts including the steps of treating the clay with $H_2S$ at elevated temperature and subsequently acid leaching the sulfided clay. The use of carbon disulfide at temperatures above about 1300° F. as the sulfiding agent for this purpose is described in our later filed application, Serial No. 681,426, now U. S. Patent No. 2,466,052.

Certain advantages are described in my application Serial No. 774,439 resulting from the use of a diluted sulfiding gas in an essentially inert hot gaseous carrier in sulfiding of clays, particularly for the preparation of improved catalysts and contact masses.

In accordance with the present invention, an active gaseous sulfide in an essentially inert carrier gas is prepared directly by contacting a heated gas substantially free from uncombined oxygen and containing minor amounts of $H_2$ and/or CO and added free sulfur, with a natural absorptive hydrosilicate of aluminum serving as a surface combustion mass, such as a clay or earth. In the presence of the combustion mass the $H_2$ and/or CO combines with S readily, forming $H_2S$ and/or $CS_2$ respectively, together with intermediate gaseous sulfides (e. g. COS). These active gaseous sulfides formed, when at a sufficiently high temperature, react with iron compounds present in the absorptive mass employed converting the same to iron sulfides; which may then be removed by acid washing or in other suitable manner. By thus forming the active sulfiding gas from relatively inexpensive sulfur and available reducing gas, important savings in cost of active sulfiding gases are provided.

Instead of employing as the surface combustion mass, the clay or earth containing iron compounds which is to be subjected to sulfidation by the sulfide gases formed, a separate contact mass may be employed to further the reactions forming the sulfiding gas, for instance the combination of hydrogen with sulfur, and the sulfide gases thus formed brought directly into contact with the iron-containing clay or earth for the required conversion of the iron compounds therein.

In the preparation of catalytic contact masses from clay by methods, including sulfidation, it is necessary to maintain the temperature below that at which the clay sinters or begins to shrink rapidly. In the case of most montmorillonite clays, including sub-bentonites, the maximum temperature to be employed, therefore, is at about 1500–1550° F., while with other clays including those containing chiefly kaolinite or a related clay mineral, somewhat higher temperatures are permitted, as up to 1600–1650° F.

The gas composition prepared in accordance with the invention may be controlled so as to contain within limits any desired proportion of active gaseous or vaporizable sulfide such as $H_2S$ or $CS_2$, depending upon the quantity of sulfur added to the starting gas and the content of components present therein reactive with sulfur under the conditions. No advantage is seen, however, for the purpose of the present invention, in having present an amount of sulfur in excess of that required to react with components of the starting gas. On the other hand, it may be desirable in many instances to employ an amount of S less than that required for reaction with components of the starting gas, so as to leave unreacted a small portion of the components reactive with sulfur.

The starting gas may be of almost any composition so long as it contains hydrogen and/or carbon monoxide and is essentially free from constituents interfering with or incompatible with the gaseous or readily vaporizable sulfides to be formed. Thus free oxygen is contraindicated, since the same would consume part of the added S in the formation of oxygenated sulfur compounds. If the ultimate sulfiding gas mixture is to be employed in the preparation of catalytically active clays, the amount of water present during contact with the clay should be reduced to a minimum by drying the starting gas and by avoiding compounds reactive under the conditions to form water in an amount in excess of about 2 mol percent of the total treating gas composition.

A convenient source of starting gas is a composition such as a flue gas obtainable by controlled combustion of a hydrocarbon fuel in air to essentially use up all of the free oxygen content.

The combustion can be controlled so that the oxygen is substantially entirely consumed and the flue gas contains appreciable quantities of $H_2$ and/or CO. From the controlled burning of a hydrocarbon such as propane, for instance, substantially oxygen-free mixtures may be obtained predominating in nitrogen and containing 0.5 to 3.0% $H_2$ and from 1 to 4.5% CO. The amount of $CO_2$ concomitantly formed will vary from about 11 to 13%; the balance of 85 to 81.5% being substantially all nitrogen, all on a water free basis. By appropriate control of combustion, mixtures containing larger amounts of $H_2$ and/or CO can also be obtained with concomitant formation of less $CO_2$ and $N_2$.

By the incomplete combustion of a hydrocarbon gas or mixture of such gases, residual unburned hydrocarbons present in the mixture will react with added sulfur to form additional quantities of desired sulfiding gas. For instance, methane directly reacts with S to form hydrogen sulfide and carbon disulfide.

For the preparation of improved catalysts, in accordance with my joint application Serial No. 644,423, hereinbefore referred to, the sulfidation of the clay should be carried out at temperatures in the order of about 1200° F. and above. With certain clays employed industrially, as in the preparation of ceramic wares, where reduction of iron to the extent obtained with the indicated high temperature sulfiding treatment is not required, lower operating temperatures for sulfidation can be employed, as in the order of 400-600° F. Here too, however, more efficient operation is had at higher temperatures up to the point that the clay irreversibly loses its plasticity or is otherwise impaired in properties for the particular purpose for which it is desired to be employed.

The following is an example of a practical operation in accordance with the invention for the preparation of a catalytic contact mass of low iron content directly utilizing the sulfiding gas formed in situ. Propane is burned in the presence of air under conditions to furnish a flue gas composed of (after drying) 1.3 mol per cent hydrogen, 1.6 mol per cent carbon monoxide, 12.7 mol per cent carbon dioxide and 84.4 mol per cent nitrogen by volume. To the gas heated to 1350° F. about 5 mol per cent of free sulfur is added in finely powdered form or as atomized liquid into the gas stream, and the hot gas containing vaporized (and partially reacted S) is brought into contact over a period of two hours with a clay mass, such as an acid-activated montmorillonite clay in pelleted form. The total volume of gas employed is that sufficient to provide $H_2S$ and $CS_2$ in about 4 times the equivalent theoretically required to react with the iron present in the clay (about 2% as $Fe_2O_3$) to convert the same to iron sulfide. The iron sulfide thus formed may be readily removed from the clay, for instance by acid leaching as described in application Serial No. 644,423 heretofore referred to. Thus, the sulfided clay is treated with dilute aqueous hydrochloric acid of 10-20% concentration at room temperature for 24 or more hours, then washed and dried. Alternatively, a separate contact mass such as kaolin clay could be employed for the initial preparation of the dilute sulfiding gas and the latter contacted with the iron-containing clay to be treated.

Although $CO_2$ has an adverse effect on the sulfidation of clay by $CS_2$ or $H_2S$, if the content of active sulfiding gas such as $CS_2$ or $H_2S$ in the treating composition is sufficient to provide at least 3 to 4 times the stoichiometric equivalent of the iron content of the clay, 10 to 15% $CO_2$ in the gas composition can be tolerated and the sulfided clays easily leached to obtain clay products of desired residual low iron content. As a general rule, during initial heating and sulfidation of the clay with dilute mixtures of $H_2S$ and/or $CS_2$ as with treating gas containing 10% or less by weight of active sulfiding agent, the volume ratio of $CO_2/H_2S$ plus $CS_2$ should not exceed about 10. It will be seen that the composition of the treating gas in the above example is well within these limits.

In the above example, the amount of sulfur added to the hot flue gas is about the theoretical quantity calculated to react with the total CO and $H_2$ content of the flue gas. Too large an excess of free sulfur should be avoided, since deposition of the same in the clay may interfere with subsequent acid leaching. The amount of sulfur added, however, should be at least sufficient to furnish an amout of $CS_2$ plus $H_2S$ calculated to react with all of the iron present in the clay and preferably several times that amount. The total quantity and rate of introduction of the treating gas should be controlled to bring the clay to required sulfiding temperature and to maintain the same at such temperature during the sulfiding action. For effective sulfidation of the clay in the preparation of improved catalysts of low iron content, temperatures above 1200° F. and preferably in the range of 1350-1450° F. should be employed. Based on air, it was found that about 1000 to 1300 volumes of gas are required to heat one volume of pelleted clay, weighing about 45 pounds per cubic foot, from room temperature to about 1400° F. This number of volumes of treating gas to clay is generally about sufficient for bringing the clay to preferred sulfidation temperatures and for effecting sulfidation, using flue gas of various compositions or other gaseous compositions predominating in nitrogen.

Possible variations in the composition of the starting gas which are readily obtainable, are shown in the following tabulation:

| | $H_2$ | Mol Percent | | $N_2$ |
|---|---|---|---|---|
| | | CO | $CO_2$ | |
| #1 From controlled oxidation of propane | 0.5 | 1.0 | 13.5 | 85.0 |
| #2 From controlled oxidation of propane | 2.8 | 4.5 | 11.3 | 81.4 |
| #3 From controlled oxidation of a domestic fuel gas (natural gas) | 6.5 | 5.0 | 6.5 | 82.0 |
| #4 From controlled oxidation of mixed fuel gas | 2.4 | 3.3 | 12.3 | 82.0 |

The quantity of active sulfiding gas formed, such as $H_2S$ and $CS_2$, with each of the above starting gases, and the consequent composition of the diluted treating gas, will be determined by the quantity of added sulfur, up to the stoichiometric amount. Thus the above compositions will theoretically yield treating gases containing from 1.0 to 9.0 mol per cent of active gaseous sulfides, calculated as $H_2S$ and $CS_2$, or constituting approximately from 2 to 13% by weight of the total treating gas.

A gas comprising essentially $N_2+H_2$ can be obtained by controlled combustion of $H_2$ in air under conditions that the amount of $H_2$ is in desired excess of that necessary to completely react with the oxygen in the air.

By the methods of the present invention, it will accordingly be seen, important advantages in the efficiency and economy of operations involving the sulfidation of clays and mineral earths are provided in addition to those derived by the use of the diluted sulfiding gas. The production of the treating gas can be readily controlled to obtain directly active sulfiding gas in a heated carrier gas of desired temperature and composition and without waste of the active sulfiding agent thus obtained and utilized. Because of the decreased handling requirements, these gaseous sulfides can be employed at the high temperatures of treatment described, with minimum corrosive effect on the treating apparatus. In addition, separate heating of the clay to required sulfidation temperature is rendered unnecessary, since the contained sensible heat of the diluted sulfiding gas as produced, can be beneficially utilized for maintaining the clay at the desired temperature during sulfidation. Moreover, the advantages resulting from the use of the diluted sulfiding gas, as pointed out in my copending application referred to, also obtain here, including substantial uniformity of sulfidation of the clay and the improved facility of iron removal, as by acid leaching, of the formed iron sulfide, with consequent consistent production of low iron products, such as catalysts, of desired quality and uniformity.

Obviously many modifications and variations of the invention as hereinbefore set forth may be made without departing from the spirit and scope thereof and therefore only such limitations should be imposed as are indicated in the appended claims.

I claim as my invention:

1. A process of directly producing a sulfiding gas mixture comprising an active gaseous sulfide in an essentially inert gaseous carrier, which comprises bringing together elemental sulfur and a gaseous reactant capable of direct combination with sulfur, at reaction temperature and in the presence of a natural absorptive hydrosilicate of aluminum, to form a sulfide which is gaseous at the reaction temperature; said reactant being selected from the group consisting of hydrogen, carbon monoxide, and mixtures of these, and being contained as a minor constituent in an essentially inert heated gaseous carrier, and said elemental sulfur being suspended in said gaseous carrier in finely divided form.

2. The process in accordance with claim 1 wherein said gaseous reactant comprises hydrogen.

3. The process in accordance with claim 1 wherein said gaseous reactant comprises carbon monoxide.

4. The process in accordance with claim 1 wherein said natural hydrosilicate of aluminum consists essentially of a clay containing iron compounds which iron compounds are thus sulfided by the gaseous sulfide formed in situ.

5. The process in accordance with claim 4 wherein said sulfidation of the clay containing iron compounds is effected at a temperature not less than 1200° F. and short of that at which rapid shrinkage of the clay will result.

6. The process of sulfiding natural absorptive hydrosilicate of aluminum containing iron compounds with dilute sulfiding gas at elevated temperature, which comprises contacting with said hydrosilicate a heated flue gas containing a minor proportion of free hydrogen and having added elemental sulfur suspended in said flue gas, said flue gas being at a temperature sufficiently high to effect chemical combination of hydrogen and sulfur in the presence of said hydrosilicate; thereby effecting conversion of iron compounds contained in said hydrosilicate to iron sulfide; said flue gas being substantially free from uncombined oxygen.

7. The process in accordance with claim 6 wherein said flue gas also contains a minor quantity of carbon monoxide.

8. The process in accordance with claim 6 wherein said flue gas is a product of controlled combustion of a hydrocarbon gas in air and is employed in dried state containing 0.5 to 3 mol per cent hydrogen, 1 to 4.5 mol per cent carbon monoxide, 11 to 13% carbon dioxide, the remainder of the composition of the flue gas alone consisting essentially of nitrogen.

9. The process of preparing catalytically active contact masses of low iron content which comprises contacting a clay containing iron compounds with a diluted sulfiding gas, at a temperature of at least 1200° F and below that at which sintering of the clay results, and thereafter leaching the iron sulfide formed with dilute acid; said diluted sulfiding gas being composed of minor amounts of hydrogen sulfide and carbon disulfide carried in an essentially inert carrier gas, and said sulfiding gas being produced by reacting with elemental sulfur and in the presence of clay, hydrogen and carbon monoxide contained in a heated gaseous mixture predominating in inert gas.

10. The process in accordance with claim 9 wherein said heated gaseous mixture predominating in inert gas is produced by controlled combustion in air of a hydrocarbon gas under conditions effecting substantially complete consumption of oxygen in the air.

11. The method of preparing from iron-containing clays catalytically active masses of improved properties, which comprises heating such a clay to a temperature of 1200–1550° F. by contact with a hot gas mixture comprising essentially inert carrier gas and minor quantities of active gaseous sulfide and maintaining the clay in contact with said hot gas mixture for a time sufficient to convert iron contained in the clay to iron sulfide, and thereafter removing the formed iron sulfide; said hot gas mixture being obtained by contacting with clay a hot substantially oxygen-free dried flue gas containing one or more reactive gases from the group consisting of hydrogen and carbon monoxide, and added elemental sulfur suspended in said flue gas, to effect conversion of the said reactive gases to gaseous sulfide.

12. The process in accordance with claim 11 wherein the quantity of active gaseous sulfide present in the gas mixture employed is at least 3 times the stoichiometric equivalent of the iron content of the clay subjected to sulfidation.

13. The process in accordance with claim 12 wherein said dried flue gas comprises 0.5 to 3% hydrogen, 1 to 4.5% carbon monoxide, 11 to 13% carbon dioxide, the remainder of the composition being substantially all nitrogen, and the quantity of added elemental sulfur is not more than the stoichiometric amount required for reaction with the hydrogen and carbon monoxide.

14. The process in accordance with claim 11 wherein said iron containing clay is a pelleted acid-activated montmorillonite.

15. The process of claim 11 wherein said hot gas mixture contains not more than 10% by weight of active gaseous sulfide.

16. In a process for sulfidation of iron-containing clays, the improvement which comprises effecting sulfidation at elevated temperature employing as heating and sulfidation medium an inert hot carrier gas containing not more than 10% by weight of the gas mixture of active sulfiding gas but in amounts at least several times the stoichiometric equivalent of the iron content of the clay, said heating and sulfidation medium being obtained by combustion of a hydrocarbon gas in air under conditions to consume substantially the entire oxygen content of the air, and contacting with clay the obtained flue gas together with added elemental sulfur at a temperature of at least 1200° F. but below that causing substantial incipient fusion of the clay.

17. The process of preparing hydrocarbon conversion catalysts of improved properties from iron-containing clays, which comprises the steps of reacting in the presence of a combustion mass and at elevated temperatures elemental sulfur and hydrogen contained in an essentially inert carrier gas to form a treating gas comprising hydrogen sulfide and unreacted components of said carrier gas, the proportions being so selected that the thus formed treating gas predominates in unreacted components of the initial carrier gas, introducing the formed treating gas into contact with an iron-containing clay at a temperature of at least 1200° F. but below that effecting substantial incipient fusion of the clay, to transform iron compounds present in the clay to iron sulfide, cooling the thus sulfided clay, and leaching the cooled clay to remove iron sulfide.

HUBERT A. SHABAKER.

REFERENCES CITED

The following references are of record in the file of this patent:

UNITED STATES PATENTS

| Number | Name | Date |
| --- | --- | --- |
| 1,351,755 | Ikeda | Sept. 7, 1920 |
| 1,565,894 | Bindschedler et al. | Dec. 15, 1925 |
| 2,214,859 | Maude et al. | Sept. 17, 1940 |